United States Patent [19]

Oberle

[11] Patent Number: 5,346,286

[45] Date of Patent: Sep. 13, 1994

[54] MATERIAL TRANSPORTING HOPPER TRAILER HAVING IMPROVED MOBILE SUPPORT FRAME

[76] Inventor: Robert G. Oberle, P.O. Box 85, Great Bend, Kans. 67530-0085

[21] Appl. No.: 871,904

[22] Filed: Apr. 21, 1992

[51] Int. Cl.⁵ .................................. B60P 1/56
[52] U.S. Cl. .................... 298/8 H; 105/418; 296/181; 298/8 T
[58] Field of Search ............ 296/181, 182; 298/7, 298/1 V, 35 M, 8 H, 8 T; 280/901; 105/362, 417, 418

[56] References Cited

U.S. PATENT DOCUMENTS

| | | | |
|---|---|---|---|
| 2,004,755 | 6/1935 | Harvey | 298/7 |
| 2,169,463 | 8/1939 | Eisenberg, Jr. | 298/7 |
| 2,616,758 | 11/1952 | Meyers | 298/7 |
| 2,620,226 | 12/1952 | Jones | 105/248 |
| 3,419,310 | 12/1968 | Gramlich | 298/8 |
| 3,733,089 | 5/1973 | Goecke et al. | 280/901 X |
| 3,857,608 | 12/1974 | Norton et al. | 298/35 M |
| 3,929,353 | 12/1975 | Burleson et al. | 280/901 X |
| 4,009,906 | 3/1977 | Sweet et al. | 222/503 |
| 4,021,074 | 5/1977 | Heiser | 296/181 X |
| 4,082,357 | 4/1978 | Schmidt et al. | 105/243 |
| 4,230,360 | 10/1980 | Eisenman | 296/181 |
| 4,258,953 | 3/1981 | Johnson | 298/27 |
| 4,324,434 | 4/1982 | Friese | 298/27 |
| 4,346,905 | 8/1982 | Smetanick | 105/248 |
| 4,818,024 | 4/1989 | Michel | 296/181 X |
| 4,946,214 | 8/1990 | Neumann et al. | 296/10 |

Primary Examiner—Michael S. Huppert
Assistant Examiner—Janice Krizek
Attorney, Agent, or Firm—John R. Flanagan

[57] ABSTRACT

A hopper trailer includes a mobile support frame and at least one gravity-flow hopper having an open-top upper box portion and a lower tapered portion. The support frame includes a pair of longitudinal channels laterally spaced from one another and a pair of front and rear channels extending transversely between and rigidly connected to the longitudinal channels at the opposite front and rear ends thereof. The longitudinal channels have respective planar structural portions directly engaged with opposites sides of the lower tapered portion of the hopper. The planar structural portions of the channels are disposed in respective planes which converge downwardly toward one another so as to thereby support the hopper in a cradled relationship therebetween. The support frame also includes a gooseneck towing tongue connected to the front end of the longitudinal channels of the support frame and a ground-supported wheel unit connected to and underlying and supporting the laterally-spaced longitudinal channels.

11 Claims, 3 Drawing Sheets

MATERIAL TRANSPORTING HOPPER TRAILER HAVING IMPROVED MOBILE SUPPORT FRAME

BACKGROUND OF THE INVENTION

1. Field of the Invention

The present invention generally relates to a trailer for transporting materials and, more particularly, to a material transporting hopper trailer having an improved mobile support frame.

2. Description of the Prior Art

Trailers for transporting particulate and granular materials, such as grain and other bulk commodities, are known in the art. Such trailers includes base frames or chassis of various constructions. Representative examples of prior art trailers are disclosed in U.S. patents to Meyers (U.S. Pat. No. 2,616,758), Jones (U.S. Pat. No. 2,620,226), Michel (U.S. Pat. No. 4,818,024) and Friese (U.S. Pat. No. 4,324,434).

U.S. Pat. No. 2,616,758 to Meyers discloses a hopper trailer having a base frame with top and bottom spaced and longitudinally extending side frame members which support the hoppers along vertical sides of the upper rectangular box portions thereof. The lower tapered portions of the hoppers extend unsupported below the bottom frame members. U.S. Pat. No. 2,620,226 to Jones discloses a hopper trailer body with a frame supporting the upper rectangular box portion of the hopper with the lower tapered portion extending unsupported below the frame. U.S. Pat. No. 4,818,024 to Michel discloses a hopper trailer having a base frame provided about the hopper bin with struts supporting the hopper.

U.S. Pat. No. 4,324,434 to Friese discloses a grain carrying trailer having a hopper with an upper box-shaped portion and a lower tapered portion and a chassis or base frame having two laterally spaced support members disposed in vertical planes and extending longitudinally along opposite sides of the tapered portion of the hopper. The hopper tapered portion is supported by horizontal panels which, in turn, are supported by the longitudinal support members.

It is perceived by the inventor herein that changes are needed in the constructions of prior art hopper trailer frames in order to lower the center of gravity and improve the stability of the trailer.

SUMMARY OF THE INVENTION

The present invention provides a hopper trailer having an improved mobile support frame designed to satisfy the aforementioned needs. The improved features of the mobile support frame of the hopper trailer of the present invention are a pair of longitudinal members and a gooseneck towing tongue connected to forward ends of the longitudinal members. The longitudinal members are disposed in planes which converge toward one another to thereby provide an improved construction for cradling and supporting the hopper or hoppers therebetween.

Accordingly, the present invention is directed to a material transporting hopper trailer comprising at least one hopper, and preferably a pair of hoppers, and a mobile support frame including a pair of longitudinal members laterally spaced apart and supporting the hoppers therebetween. Each hopper includes a lower tapered portion and an open-top upper box portion connected with and disposed above the lower tapered portion. The longitudinal members have respective longitudinal planar structural portions directly engaged with opposite sides of the lower tapered portion of the hopper in a supporting relationship therewith. The longitudinal planar structural portions of the longitudinal members are disposed in respective planes which converge downwardly toward one another such that the longitudinal members engage the opposite sides of the hopper and thereby support the hoppers in a cradled relation therebetween. By lying in the longitudinal planes, the longitudinal members of the support frame are disposed at opposing inclinations with respect to one another. Thus, the longitudinal members are disposed at opposite acute angles relative to vertical and horizontal planes.

Also, the mobile support frame includes a pair of transverse members extending between and interconnecting the longitudinal members at opposite front and rear ends thereof. The mobile support frame also includes a towing tongue having a gooseneck configuration and being mounted to the forward ends of the longitudinal members of the mobile support frame. The mobile support frame further includes a ground-supported wheel unit connected to and underlying and supporting said laterally-spaced longitudinal members.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the following detailed description, reference will be made to the attached drawings in which.

DETAILED DESCRIPTION OF THE INVENTION

Figure 1:
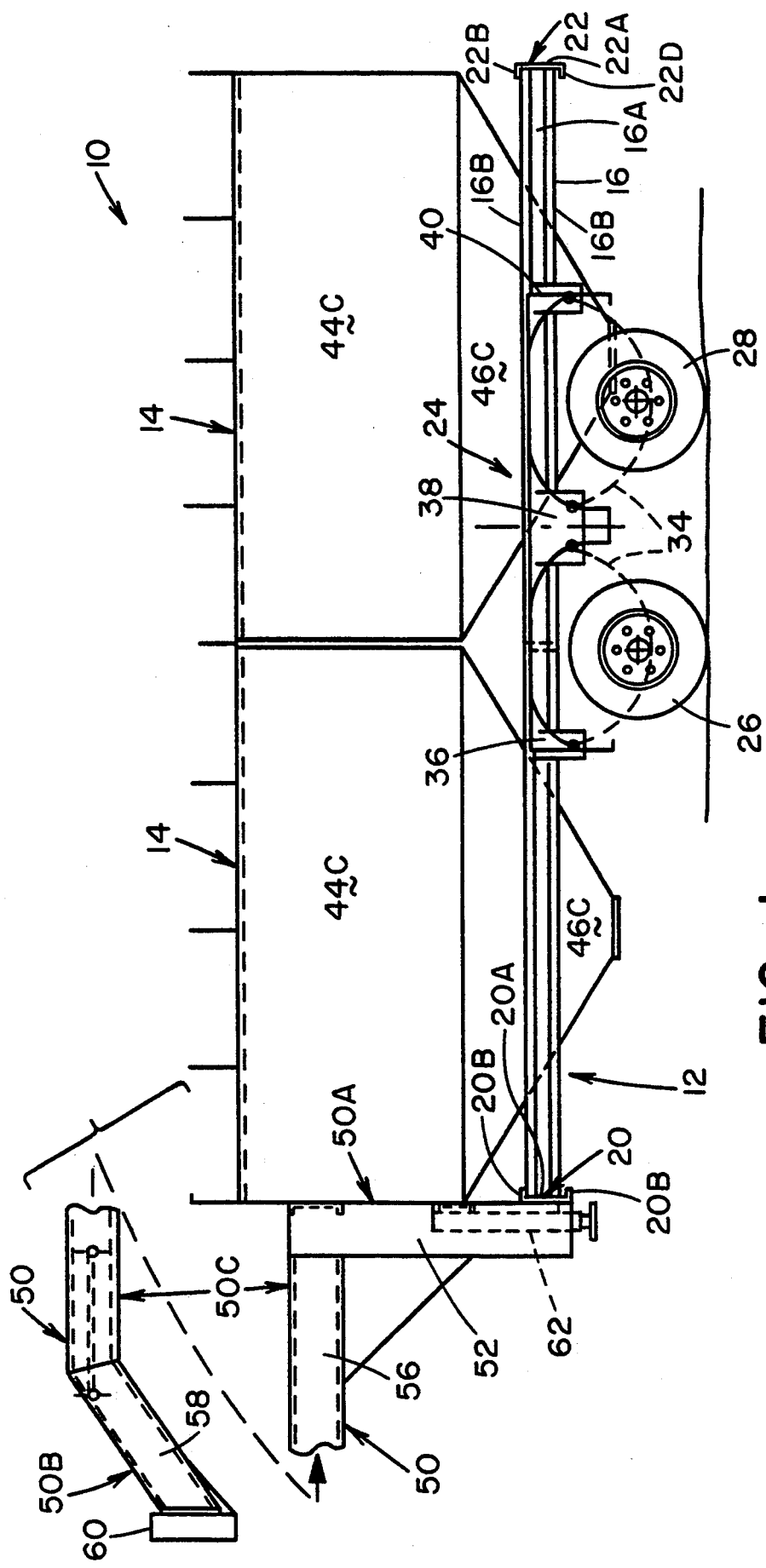
FIG. 1 is a side elevational view of a hopper trailer having a mobile support frame constructed in accordance with the present invention.
Figure 2:
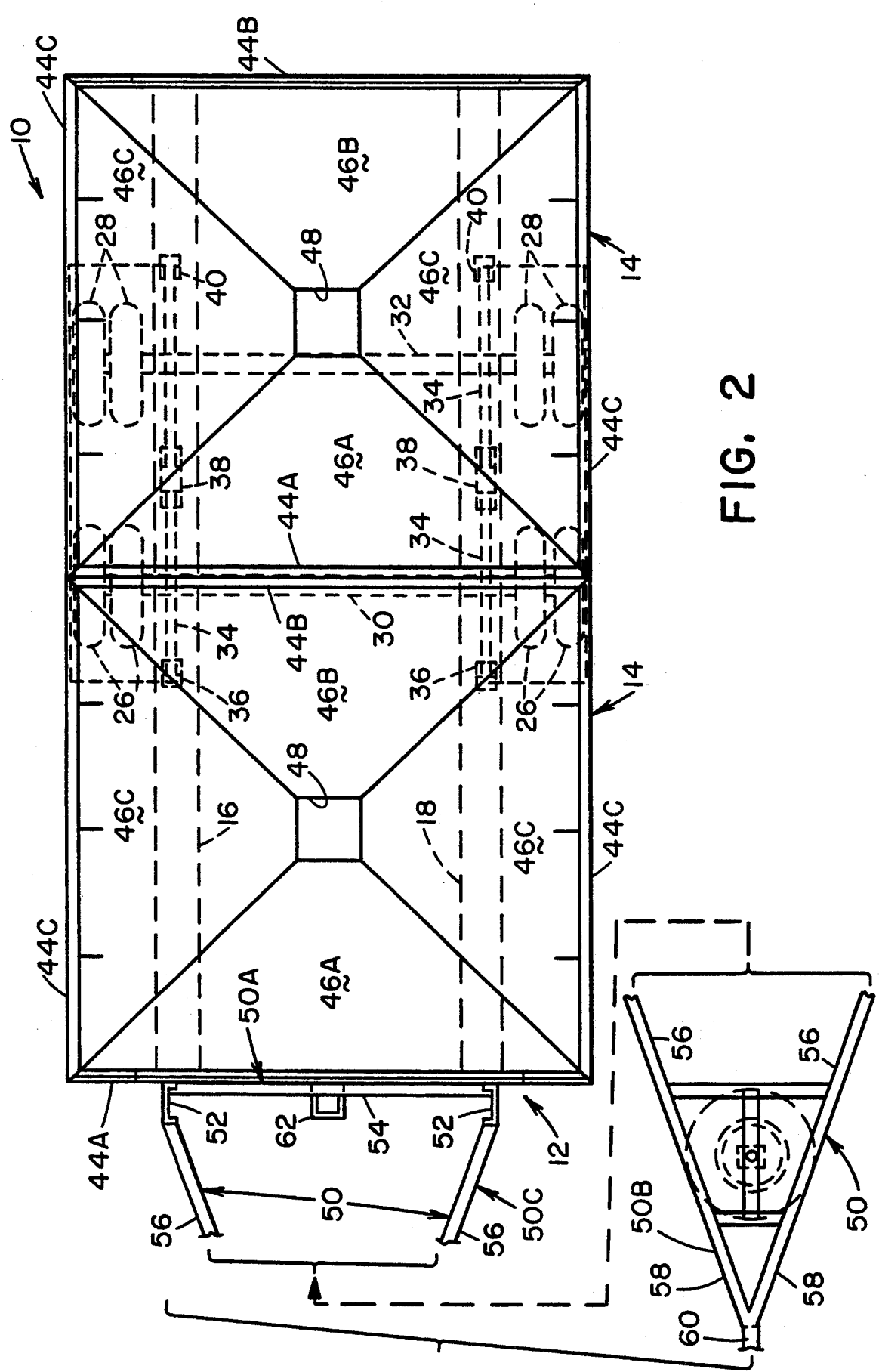
FIG. 2 is a top plan view of the trailer.
Figure 3:
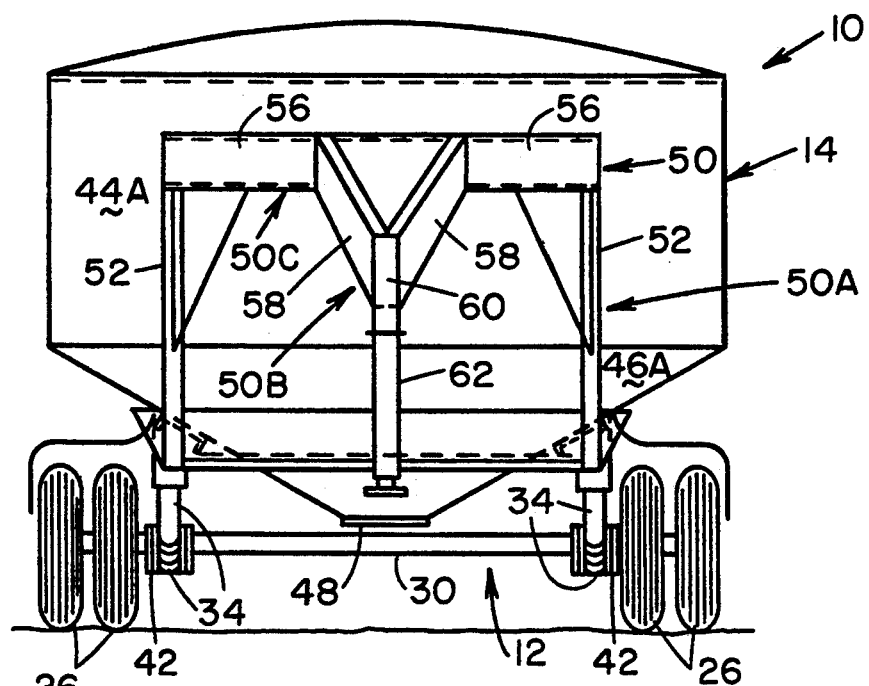
FIG. 3 is a front elevational view of the trailer.

Referring to FIGS. 1-3, there is illustrated a preferred embodiment of a hopper trailer of the present invention, generally designated 10. The hopper trailer 10 basically includes a mobile support frame 12 and at least one and preferably a pair of tandemly-arranged hoppers 14 supported by the mobile frame 12. The mobile support frame 12 of the hopper trailer 10 includes a pair of right and left longitudinal members 16, 18 being laterally spaced apart from one another, and a pair of front and rear transverse members 20, 22 extending between and rigidly connected to the right and left longitudinal members 16, 18 at repective opposite front and rear ends thereof such that the transverse and longitudinal members 20, 22 and 16, 18 togther define a rigid base structure having a rectangular configuration.

The mobile support frame 12 of the hopper trailer 10 also includes a ground-supported wheel unit 24 connected to and underlying and supporting the laterally-spaced right and left longitudinal members 16, 18. The wheel unit 24 includes front and rear pairs of tandemly-arranged wheels 26, 28 rotatably mounted to opposite ends of front and rear tranvserse axles 30, 32, and sets of elongated leaf-type suspension springs 34 pivotally mounted at opposite ends to respective front, middle and rear hanger brackets 36, 38, 40 attached to the respective right and left longitudinal members 16, 18. As shown in dashed outline form in FIG. 2 and partially broken away form in FIG. 3, the sets of suspension springs 34 pass under the opposite ends of the respective front and rear axles 30, 32 adjacent to the interior sides of the wheels 26, 28 and are attached to the axles by U-shaped brackets 42.

Figure 4:
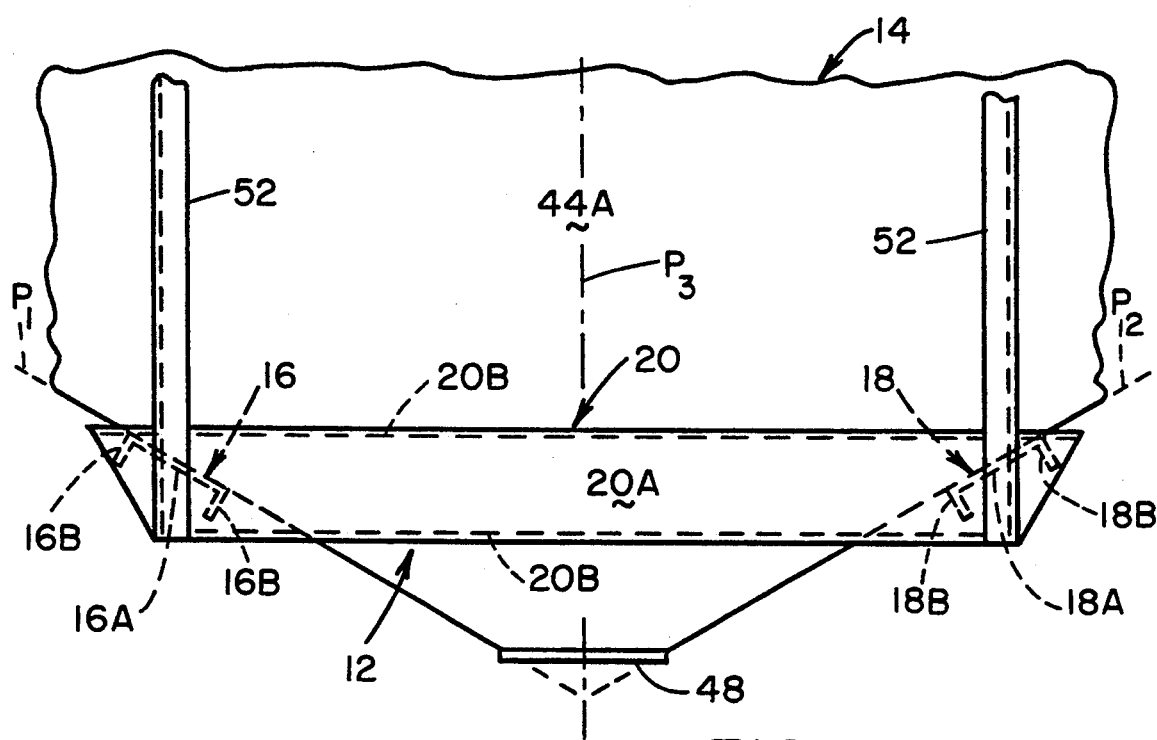
FIG. 4 is an enlarged fragmentary front elevational view of the trailer.

Each hopper 14 of the trailer 10 includes an upper box-shaped portion 44 and a lower tapered portion 46. The upper box-shaped portion 44 of each hopper 14 includes a plurality of planar front, rear and opposite side walls 44A, 44B, 44C interconnected in a rectangular configuration and defining upper and lower open ends. The lower tapered portion 46 of each hopper 14 includes a plurality of planar front, rear and opposite side walls 46A, 46B, 46C interconnected in a tapered pyramidal configuration and defining spaced upper and lower open ends. The lower tapered portion 46 is connected at the upper end thereof to lower end of the upper box portion 44 and has a lower discharge outlet 48 at the lower end of the lower tapered portion 46. Closure gate mechanisms (not shown) are mounted to the lower ends of the hoppers 14 and can be operated to open and close the discharge outlets 48. As seen in FIG. 4, each of the opposite side walls 46C of the lower tapered portion 46 of the hopper 14 are oppositely inclined relative to one another by being disposed along one of a pair of respective opposite inclined side planes $P_1$, $P_2$ which extend between opposite front and rear ends of the hopper 14 and diverge from one another upwardly and outwardly away from a pair of opposite sides of a substantially vertical central plane $P_3$ which extends between the front and rear ends of the hopper 14.

Referring to FIGS. 3 and 4, the right and left longitudinal members 16, 18 are shallow U-shaped channel-like beams which have respective longitudinal main planar structural portions 16A, 18A and a pair of reinforcing flange portions 16B, 18B fixed along opposite edges of the main planar structural portions 16A, 18A. The front and rear transverse members 20, 22 have substantially the same main planar structural portions 20A, 22A and flange portions 20B, 22B. While the main planar structural portions 20A, 22A of the front and rear transverse members 20, 22 are disposed in substantially vertical planes, the main planar structural portions 16A, 18A of the longitudinal members 16, 18 are disposed in respective opposite inclined side planes $P_1$, $P_2$ and are directly engaged in a flush relationship with similarly oppositely inclined opposite side walls of the lower tapered portion 46 of the hopper 14 at respective locations between and spaced from the upper and lower ends of the lower tapered portion 46. In such manner, the longitudinal members 16, 18 of the support frame 12 support the lower tapered portions 46 of hoppers 14 in a cradled relationship therebetween with the lower ends of the lower tapered portions 46 of the hoppers 14 projecting downwardly below the longitudinal members 16, 18 of the support frame 12. In such orientations, the right and left longitudinal members 16, 18 are disposed in opposite inclinations with respect to one another lying in the respective longitudinal planes $P_1$, $P_2$. Thus, the right and left longitudinal members 16, 18 are disposed at opposite acute angles relative to the central vertical plane $P_3$. The adjacent rear wall 44B of the front hopper 14 and front wall 44A of the rear hopper 14 are rigidly attached to one another, such as by welding. Also, the side walls 46C of the front and rear hoppers 14 are rigidly attached, such as by welding, to the main planar structural portions 16A, 18A of the right and left longitudinal members 16, 18.

Referring again to FIGS. 1–3, the mobile support frame 12 of the trailer 10 further includes towing tongue 50 which has an overall gooseneck configuration and is mounted to front ends of the right and left longitudinal members 16, 18 of the support frame 12. The towing tongue 50 basically includes a rear vertical portion 50A, a front downwardly inclined portion 50B and a middle horizontal portion 50C extending between and interconnecting an upper end of the rear vertical portion 50A and a rear end of the front downwardly inclined portion 50B.

More particularly, the rear vertical portion 50A of the tongue 50 includes a pair of laterally spaced upright members 52 extending along the front wall 44A of the upper box-shaped portion 44 of the forward one of the hoppers 14 and being mounted at lower ends of the upright members 52 to the opposite ends of the front transverse member 20 and to the front ends of the longitudinal members 16, 18. The rear vertical portion 50A of the tongue 50 also includes a top horizontal member 54 extending between and rigidly connected to the upper ends of the upright members 52.

The middle horizontal portion 50C of the tongue 50 includes a pair of middle members 56 rigidly connected at rear ends to the top horizontal member 54 of the rear vertical portion 50A of the tongue 50 and extending forwardly therefrom in a converging relation to one another. The front downwardly declined portion 50B of the tongue 50 includes a pair of front members 58 rigidly connected at rear ends to front ends of the middle members 56 of the middle horizontal portion 50C of the tongue 50 and extending forwardly and downwardly therefrom in a declining converging relation to one another. The front portion 50B of the tongue 50 also includes a hitch element 60 mounted to a forward end thereof.

The trailer 10 also includes a jack member 62, being conventional per se, releasably mounted on the front transverse member 20 of the support frame 12. The jack member 62 can be actuated to lower into contact with the ground to support the front end of the trailer 10 and the gooseneck towing tongue 50 at a desired height above the ground when the hitch is disconnected from a towing vehicle (not shown).

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A material transporting hopper trailer, comprising:
    (a) at least one hopper having a pair of opposite front and rear ends and including a lowered tapered portion having a pair of opposite inclined side walls, each of said inclined side walls of said lowered tapered portion of said hopper being disposed along one of a pair of respective opposite inclined side planes which extend between said opposite front and rear ends of said hopper and diverge from one another upwardly and outwardly away from a pair of opposite sides of a substantially vertical central plane which extends between said front and rear ends of said hopper; and (b) a support frame including a pair of longitudinal members extending between said front and rear ends of said hopper and being laterally spaced apart from one another, each of said longitudinal members being a substantially U-shaped channel in cross-section and having a longitudinal planar main structural portion and a pair of reinforcing flange portions attached along opposite edges of said main structural portion, said planar main structural portions of said longitudinal members being directly engaged in a flush relationship with said opposite inclined side walls of said lower tapered portion of said hopper such that said longitudinal planar main structural portions of said longitudinal members are disposed in said respective inclined side planes and thereby support said lower tapered portion of said hopper in a cradled relationship therebetween.

2. The trailer of claim 1 wherein said longitudinal members of said support frame supports a pair of said hoppers disposed in a tandem relationship thereon, each of said hoppers having said lower tapered portion.

3. The trailer of claim 1 wherein said hopper also includes an upper box portion having upper and lower ends, said lower tapered portion of said hopper having spaced upper and lower ends, said lower tapered portion being connected at said upper end thereof to said lower end of said upper box portion and having a discharge outlet at said lower end of said lower tapered portion.

4. The trailer of claim 1 wherein said support frame also includes a towing tongue having a gooseneck configuration and being mounted to forward ends of said longitudinal members of said support frame.

5. The trailer of claim 1 wherein said support frame also includes a ground-supported wheel unit connected to and underlying and supporting said laterally-spaced longitudinal members.

6. The trailer of claim 1 wherein said support frame also includes a pair of transverse members extending between and rigidly interconnecting said longitudinal members at opposite front and rear ends thereof such that said transverse and longitudinal members together define a rigid base structure having a rectangular configuration.

7. The trailer of claim 1 wherein said hopper also includes an open-top upper box portion connected with and disposed above said lower tapered portion.

8. The trailer of claim 7 wherein said support frame also includes a towing tongue having a gooseneck configuration and being mounted to front ends of said longitudinal members of said support frame, said tongue including a rear vertical portion, a front downwardly declined portion and a middle horizontal portion extending between and interconnecting an upper end of said rear vertical portion and a rear end of said front downwardly declined portion.

9. The trailer of claim 8 wherein:

said rear vertical portion of said tongue includes a pair of laterally spaced upright members extending along a front side of said hopper and being mounted at lower ends of said upright members to said longitudinal members and a top horizontal member extending between and rigidly connected to upper ends of said upright members;

said middle horizontal portion of said tongue includes a pair of middle members rigidly connected at rear ends to said top horizontal member of said rear vertical portion of said tongue and extending forwardly therefrom in a converging relation to one another; and said front downwardly declined portion of said tongue includes a pair of front members rigidly connected at rear ends to front ends of said middle members of said middle horizontal portion of said tongue and extending forwardly and downwardly therefrom in a declining converging relation to one another, said front portion also including a hitch element mounted to a forward end thereof.

10. The trailer of claim 3 wherein said upper box portion of said hopper has a rectangular configuration.

11. A material transporting hopper trailer, comprising:

(a) at least one hopper including a lower tapered portion and an open-top upper box portion connected with and disposed above said lower tapered portion; and (b) a support frame including a pair of longitudinal members each having front and rear ends, said longitudinal members being laterally spaced apart and extending between opposite front and rear ends of said hopper, said longitudinal members having respective longitudinal planar structural portions directly engaged with opposite sides of said lower tapered portion of said hopper, said longitudinal planar structural portions of said members being disposed in respective planes which converge downwardly toward one another such that said members engage said opposite sides of said hopper and thereby support said hopper in a cradled relationship therebetween; and (c) said support frame also including a towing tongue having a gooseneck configuration and being mounted to said front ends of said longitudinal members of said support frame, said tongue including a rear vertical portion, a front downwardly declined portion and a middle horizontal portion extending between and interconnecting an upper end of said rear vertical portion and a rear end of said front downwardly declined portion;

(d) said rear vertical portion of said tongue including a pair of laterally spaced upright members extending along a front side of said hopper and being mounted at lower ends of said upright members to said front ends of said longitudinal members and a top horizontal member extending between and rigidly connected to upper ends of said upright members;

(e) said middle horizontal portion of said tongue including a pair of middle members rigidly connected at rear ends to said top horizontal member of said rear vertical portion of said tongue and extending forwardly therefrom in a converging relation to one another;

(f) said front downwardly declined portion of said tongue including a pair of front members rigidly connected at rear ends to front ends of said middle members of said middle horizontal portion of said tongue and extending forwardly and downwardly therefrom in a declining converging relation to one another, said front portion also including a hitch element mounted to a forward end thereof.

* * * * *